United States Patent [19]

La Salle et al.

[11] Patent Number: 4,862,491

[45] Date of Patent: Aug. 29, 1989

[54] REMOTE DISCONNECTION AND SHORT-CIRCUITING APPARATUS AND METHOD

[75] Inventors: Roger J. La Salle, Donvale; Roger H. S. Riordan, East Brighton, both of Australia

[73] Assignee: Teletech Pty. Ltd., Australia

[21] Appl. No.: 181,533

[22] Filed: Apr. 13, 1988

[30] Foreign Application Priority Data

Apr. 14, 1987 [AU] Australia .................................. PI1473

[51] Int. Cl.$^4$ ........................ H04B 3/46; H04M 1/24
[52] U.S. Cl. ........................................ 379/6; 379/21; 379/26; 379/29; 379/102
[58] Field of Search ................... 379/6, 352, 372, 24, 379/29, 102, 105; 324/539

[56] References Cited

U.S. PATENT DOCUMENTS

| 4,536,703 | 8/1985 | Jablway et al. | 379/29 |
| 4,686,696 | 8/1987 | Lynch | 379/29 |

*Primary Examiner*—Stafford D. Schreyer
*Attorney, Agent, or Firm*—Nixon & Vanderhye

[57] ABSTRACT

Apparatus for remote disconnection and short-circuiting of a pair of conductors, such as those comprising a telephone line, consists of a switching unit and a probe unit. The switching unit is capable of generating a tone and the tone may be sent down the pair of conductors, where the probe unit is used to identify the pair. The probe unit is also able to send bursts of a signal along the pair, upon receipt of which the switching unit switches sequentially from a first mode (when the tone is applied to the conductors) to a second-mode (where the conductors are disconnected) to a third mode (where the conductors are short circuit). The apparatus is useful in line fault location and telephone apparatus installation.

31 Claims, 3 Drawing Sheets

REMOTE DISCONNECTION AND SHORT-CIRCUITING APPARATUS AND METHOD

BACKGROUND OF THE INVENTION

1. Field of the Invention

This invention relates to remote disconnection and short-circuiting of a pair of conductors such as those used in telephone or other communications lines.

2. Description of the Prior Art

One of the most common types of fault in telephone lines is the appearance of resistive paths between legs of a pair to earth, or from one conductor of a pair to another. The resistance of such faults may vary from zero ohms to a megohm or more. The most common technique for locating such faults is to use a Varley bridge type fault locator which requires a short-circuit strap to be placed at one end of the suspect pair.

Usually the following fault location procedure is followed. A telephone technician places an audio-frequency oscillator on the pair at one end and then proceeds to the other end of the line. The technician then identifies the pair using a very high gas receiver which converts a received signal to an audio output. By searching through the cabling at the remote end of the line, the technician is able to locate the correct pair by looking for the conductors carrying the loudest signal and detecting the null, or area of no signal, in the gap midway between the conductors of the pair. This detection confirms and positively identifies the pair.

Varley fault location is only able to proceed when the oscillator end of the line is strapped, that is, short-circuited. At present, such an operation requires the technician to travel to the other end of the line, connect a strap to the line, and then travel back to the remote end, where the pair identification has taken place. He then connects the Varley fault locator and proceeds with the location of the fault.

Clearly, this manner of pair identification for fault location is inefficient and costly. The same disadvantages exist in present methods for the installation of telephones or other communications equipment.

In such a situation, the telephone pair is connected to a functioning telephone exchange, and thus has typically, 50V between the legs or conductors of the pair. The telephone installer connects an oscillator to the pair at the exchange, or at an intermediate point between the exchange and the subscriber's premises, and then proceeds to the cable joint nearest to the premises to locate the particular pair to which the telephone or other apparatus is to be connected.

Having located the pair, the installer must connect the telephone and undertake dial and ringback tests. Such tests are only able to be undertaken if the oscillator is firstly removed from the exchange end of—or intermediate point in—the line. This requires the installer to travel to the exchange or intermediate point to disconnect the oscillator from the pair. The installer then returns to the subscriber's premises, connects the telephone or other apparatus and is then able to call the exchange and ask for ringback tests to confirm that the line is operational.

As with fault location, the present installation procedure involves the technician in travel which is time-consuming and, as a result, costly. In some circumstances, when a technician at the non-exchange end of a line has access to a telephone operating on another line, or to radio communications equipment, he may be able to instruct a second technician at the exchange to perform certain functions at the exchange end of the line in question. However, such access is not usually available, and the use of a second technician would also be costly. Of course, many unmanned exchanges are now used, and if such an exchange were involved, or an intermediate pillar, such a second technician could in any event not be readily utilized.

BRIEF SUMMARY OF THE INVENTION

It is an object of the invention to provide a method and apparatus for remote short-circuiting and disconnection of a pair of conductors in a line, which does not involve a technician in travel between ends of a line.

The invention provides apparatus for remote disconnection and short-circuiting of a pair of conductors, including:
(a) a switching unit adapted to be connected to one end of said pair of conductors, and
(b) a probe unit adapted to be connected to the other end of said pair of conductors, said probe unit having signal generation means for generating a signal having predetermined characteristics, said signal being capable of being sent by said probe unit along said pair of conductors, said switching unit including detection means for detecting said signal, and switching means for carrying out switching operation on said pair of conductors in response to the receipt of said signal.

The invention also provides a method for disconnecting and short-circuiting a pair of conductors, including the steps of connecting a switching unit to one end of said pair, and connecting a probe unit to the other end of said pair of conductors, causing said probe unit to apply a predetermined signal to said pair, said switching unit being responsive to said signal to switch said conductors between a number of predetermined modes.

DETAILED DESCRIPTION OF THE PREFERRED EMBODIMENTS

The apparatus for short-circuiting and disconnecting a line 18 includes a switching unit 10 and a probe unit 12. In use, as is discussed in detail hereinafter, the switching unit 10 is connected to one end of a pair 14,16 of conductors constituting, for example, a telephone line 18, and the probe unit 12 is used at the other end thereof.

Figure 1:
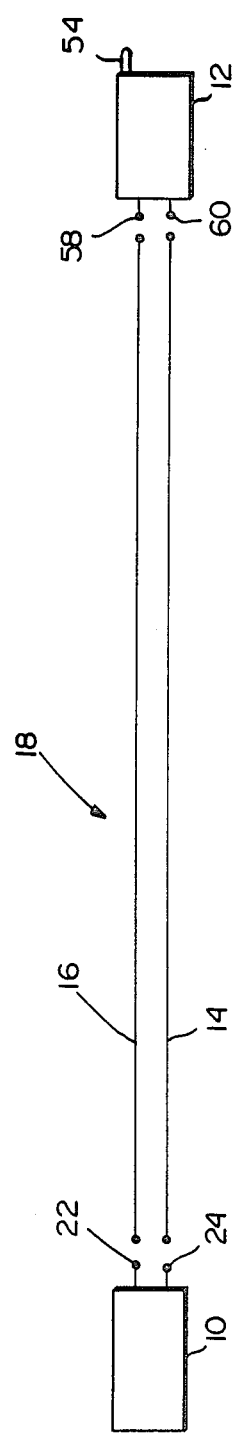
FIG. 1 is a block diagram of a telephone line with the switching unit and the probe unit of one embodiment of the apparatus of this invention in position to be attached thereto.
Figure 2:
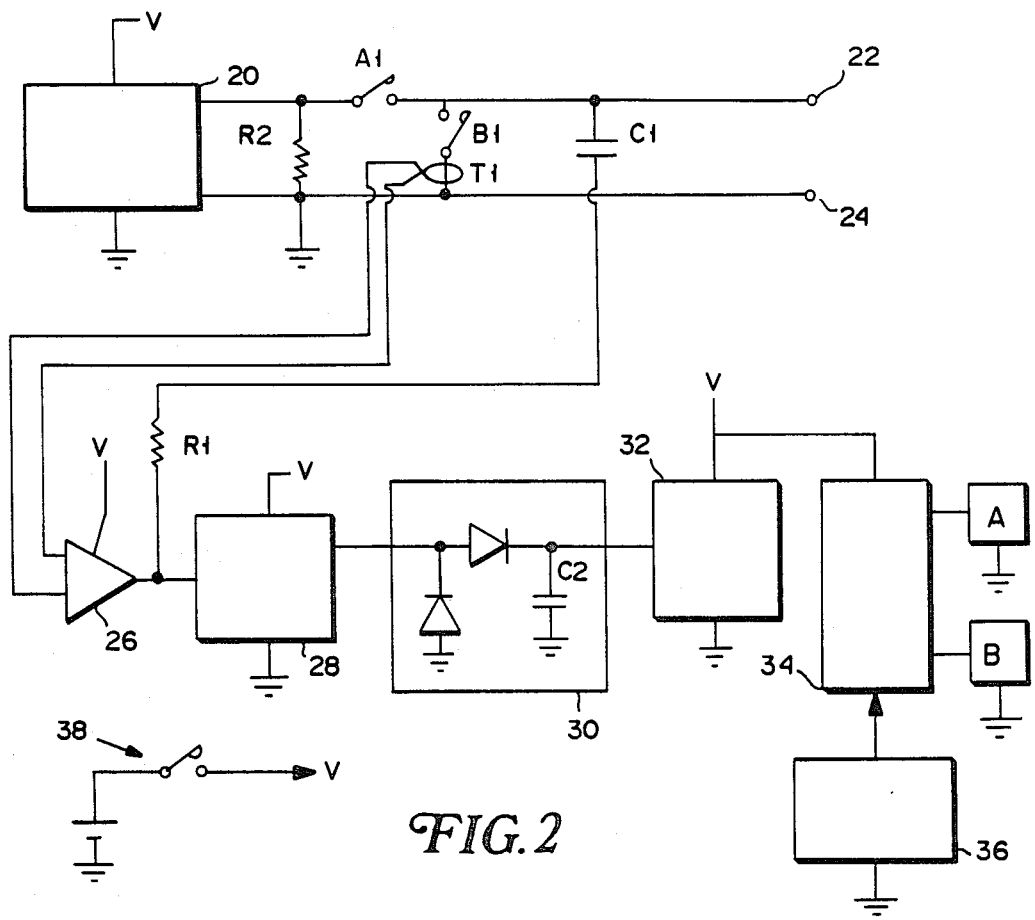
FIG. 2 is a block diagram of the switching unit of the apparatus of FIG. 1.

In this embodiment, units 10 and 12 are hand-held and battery-operated. Firstly, with particular reference to FIG. 2, we describe switching unit 10.

The switching unit 10 includes an audio-frequency oscillator 20 which is capable of producing a tone such as a warble tone, preferably in the range 1.5 kHz to 3.0 kHz. The oscillator 20 may be shunted by resistor R2, which preferably has a value of one kilohm.

Contacts 22,24 are available for connection to pairs 14,16 of a telephone line 18. The switching unit 10 also includes a preamplifier 26, a narrow band filter 28, preferably operating at about 175 Hz, a diode pump rectifier 30, a Schmitt trigger 32, flip-flops 34 and bistable relays A and B (with relay contacts A1 and B1 respectively). Other elements are a power source V—as mentioned earlier, this is preferably provided by batteries—a reset switch 36, an on/off switch 38, a sensitive current transformer T1, capacitors C1 (preferably 0.0033 microfarad) and C2 and resistor R1, which is preferably a one megohm resistor.

Figure 5:
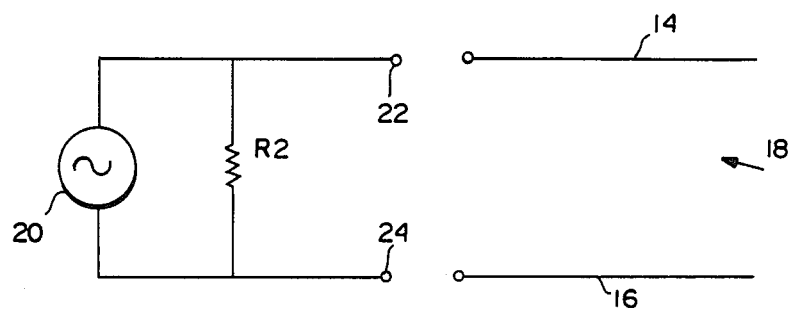
FIG. 5 is a line situation diagram with the switching unit in a first mode.
Figure 6:
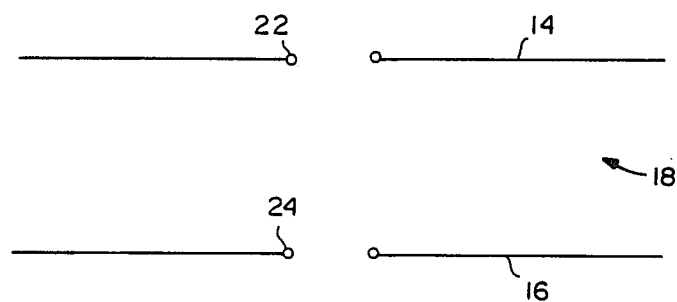
FIG. 6 is a line situation diagram with the switching unit in a second mode.

The operation of switching unit 10 will now be described. When unit 10 is switched on at 38, the oscillator 20 comes up in warble tone mode using the switch-on reset 36 to trigger the flip-flops 34 so that relay A is closed and relay B is open. It can be seen that the warble tone of oscillator 20 is provided to line 18 through contacts 22,24. The first mode is shown in FIG. 5. The output across pair 14,16 is in the vicinity of 0.7V.

When a signal—preferably a 175 Hz signal—appears on line 18 [as a result of probe unit 12 being activated (to be described hereinafter)] the signal is sampled, and that sample is supplied to narrow-band filter 28 via C1 and R1. The diode pump rectifier 30 raises the voltage on C2 to operate Schmitt trigger 32, which in turn operates the flip-flops 34 and bistable relays A and B.

Thus the mode of switching unit 10 changes to a second 'disconnect' mode (FIG. 2) in which case relay A opens and relay B remains open. To all intents and purposes, the telephone line 18, looking 'into' the unit 10, is an open circuit with C1 and R1 appearing as shunts. The value of C1 is, as stated, preferably small, and from a telephone apparatus viewpoint, simply appears as cable mutual capacitance. The value of R1 is chosen high, as stated, preferably 1 megohm, to further make the condition of line 18 look like an open circuit.

Figure 7:
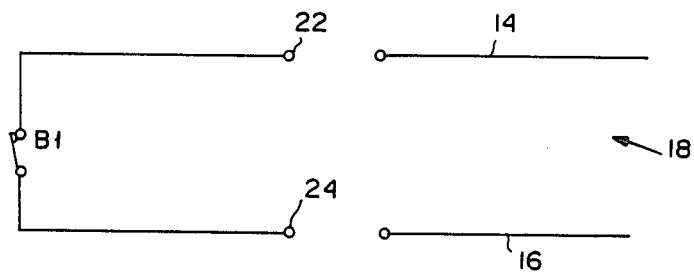
FIG. 7 is a line situation diagram with the switching unit in a third mode.

On receipt of a second signal on line 18, again from probe unit 12 and again is sampled, the sample being supplied to filter 28 via C1 and R1, thence to the diode pump rectifier 30, Schmitt trigger 32 and to flip-flops 34. Relay B closes, and relay A remains open. In this mode, line 18,'looking into' switching unit 10, sees a DC short circuit. In this mode (FIG. 7) line 18 is in a condition where it may be used for Varley fault location or DC resistance checks.

On receipt of a further signal, again from probe component 12 and again preferably about 175 Hz, a different manner of signal detection is employed by switching unit 10. Current generated by the signal flows through relay contact B1 and current transformer T1. Transformer T1 takes a sample of the 175 Hz signal, which sample is then pre-amplified by pre-amplifier 26 before being applied to narrow-band filter 28, the Schmitt trigger 32 and the flip-flop array 34. Relay B opens and A closes so that the switching unit 10 returns to the first mode (FIG. 5). The transformer T1 may be replaced by a series resistor, typically having a value of 50 milliohm, although the switching unit 10 does not then operate as accurately in the Varley fault location mode.

It can be seen that by sending repetitive bursts of signal from probe unit 12, the switching unit 10 can switch from one mode to another mode, for example, sequentially from first mode to second mode to third mode and back to first mode as required.

Figure 3:
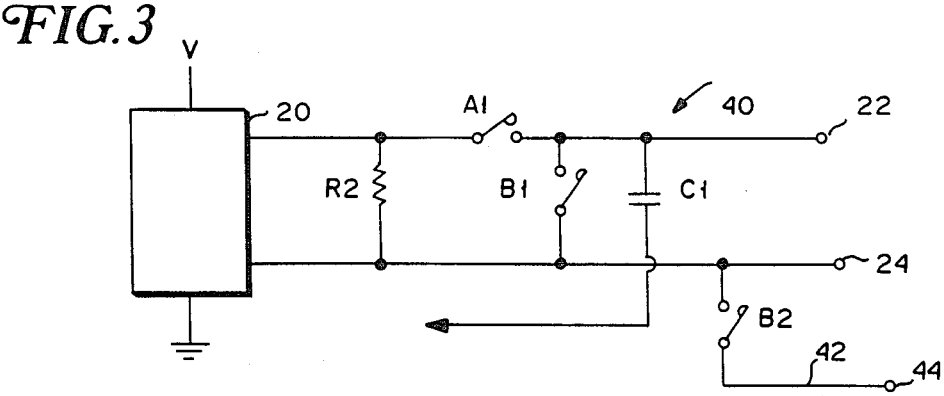
FIG. 3 is a block diagram of a switching unit enhancement.

FIG. 3 shows an enhanced version 40 of switching unit 10.

In FIG. 3, a third conductor 42 is added to provide a third contact 44, with an additional relay contact B2, to the pair (14, 16) under test. This third conductor 42 is commonly used in Varley fault location procedure, and, if available, its use provides for greater fault location accuracy.

Figure 4:
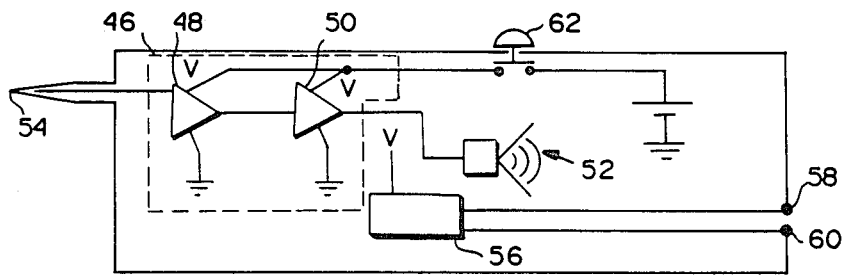
FIG. 4 is a block diagram of the probe unit of the apparatus of FIG. 1.

FIG. 4 shows probe unit 12. The probe unit 12 includes a sensitive high-gain receiver 46, which is used to detect the preferred 1.5 kHz–2.5 kHz warble tone applied to a line 18 by switching unit 10.

Receiver 46 consists of a high-grade high input impedance preamplifier 48, preferably an audio preamplifier, and a power amplifier 50 which drives an acoustic or other signal device such as a loudspeaker 52 or piezoelectric device. The use of piezoelectric transducer has the benefit of reducing current drain from the battery. Typically, the drain is 5 mA with such a transducer, compared to around 40 mA with another component. Preferably, the output of the high impedance amplifier 48 is fed via an ideal rectifier, acting as a frequency doubler, to the piezoelectric transducer, the purpose of the frequency doubler being to match the frequency of the identification tone more closely to the resonant frequency of the piezoelectric transducer to obtai the maximum effective audio signal output. More preferably, the output of the frequency doubler is fed via two amplifiers out of phase to the two sides of the piezoelectric transducer, so that the effective output signal from the transducer is effectively doubled.

Coupling of the receiver 46 to line 18 is capacitive via an insulated metal probe 54. By introducing the probe 54 near the cable including the line pair carrying the warble tone a signal is received and that reception is signalled to the technician by device 52. As the probe 54 is moved closer to the pair 14,16 without direct electrical connection the volume of the signal increases, thus allowing identification of the pair. The probe unit 12 is capable of being used to detect the null referred to in the Description of the Prior Art herein, by moving the probe 54 to find the desired position.

The probe unit 12 also includes an oscillator 56, preferably a 175 Hz oscillator. The oscillator 56 functions when push-button switch 62 is operated, and the output of oscillator 56 is applied to a pair 14,16 by contacts 58,60.

The units 10,12 of the present embodiment are used by a fault-locating technician as follows.

Before leaving the exchange or an intermediate junction, the technician couples a switching unit 10 to a desired pair 14,16 via contacts 22,24. The switching unit 10 is switched on, and automatically resets via the 'power on' reset switch 36 to the first mode (FIG. 5).

The technician then travels to a remote end of the line 18 formed of pair 14,16, taking with him a probe unit 12. When he arrives at the remote end of the line 18, he identifies the pair 14,16 using the probe 54 and the technique described hereinbefore.

Having located the pair, or if the pair is known, the technician connects contacts 58,60 to conductors 14,16. By depressing push-button switch 62 he generates a signal which travels down the line to switching unit 10.

The switching unit 10 then switches to the second mode. A further signal burst then switches the switching unit 10 to the third mode, in which state the technician is able to conduct Varley fault location. If the technician were installing a telephone set or other such equipment, he would leave the switching unit 10 in the second mode.

When the technician has finished his task at the remote end of the line, he disconnects probe unit 12 and departs. Back at the exchange or at the intermediate junction, the technician removes the switching unit 10 from the line 18.

It can be seen that the use of the described embodiment of the invention permits a technician to detect faults or otherwise test telephone lines, without having to undertake unnecessary travel. Accordingly, use of the invention will result in the saving of time, with a resultant saving in cost.

It should be noted that the preferred signalling frequency for the probe unit 12 of around 175 kHz has been selected for Australian use for the following reasons:

(a) It is not a harmonic of the commonly used power frequency 50 Hz and hence there is less likelihood of switching unit 10 tripping on the receipt of spurious signals from mains-borne interference sources;

(b) The signal, having a frequency beneath the nominal telephone bandwidth of 300 Hz to 3500 Hz, would be substantially inaudible to a subscriber;

(c) Some telephone lines use loading coils or other line equalization devices which are in nature generally low pass filters. The 175 Hz signal is therefore not attenuated by such filters.

It should be noted that in other countries, that other signalling frequencies may be used. 150 Hz could be used in the United States of America.

It should also be understood that telephone lines on which the present invention is intended to be used are subject to transient voltages of quite a high order, and consequently protection diodes and transient suppression devices in the form of metal oxide varistors are used where possible to minimize the damaging effects of such transients.

We claim:

1. Apparatus for remote disconnection and short-circuiting of a pair of conductors, including:
   (a) a switching unit adapted to be connected to one end of said pair of conductors, and
   (b) a probe unit adapted to be connected to the other end of said pair of conductors,
   said probe unit having signal generation means for generating a signal having predetermined characteristics, said signal being capable of being sent by said probe unit along said pair of conductors, said switching unit including detection means for detecting said signal, and switching means for carrying out switching operation on said pair of conductors in response to the receipt of said signal.

2. Apparatus according to claim 1, wherein upon the receipt of successive signals from said probe unit, said switching means is adapted to switch between a predetermined number of modes.

3. Apparatus according to claim 2, wherein said switching between modes operates sequentially.

4. Apparatus according to claim 2, wherein said predetermined modes consist of a first mode in which a tone may be applied to said line, a second mode wherein the pair is disconnected, and a third mode wherein the pair is short-circuited.

5. Apparatus according to claim 1, wherein the signal generated by said probe unit is generated by an oscillator.

6. Apparatus according to claim 5, wherein the frequency of said signal is around 175 Hz.

7. Apparatus according to claim 5, wherein the frequency of said signal is about 150 Hz.

8. Apparatus according to claim 1, wherein said switching unit also includes an oscillator for applying a second signal or tone to said pair, said probe unit having a receiver adapted to receive said second signal and to produce a technician-observable signal representative of said second signal, the variation in the intensity of said technician-observable signal being able to be used for pair identification.

9. Apparatus according to claim 8, wherein when said switching unit is switched on, said switching unit automatically re-sets to a condition where said oscillator is operative to generate said second signal.

10. Apparatus according to claim 8, wherein said second signal is a warble tone in the range 1.5 kHz to 3 kHz, at a rate between 3 Hz and 10 Hz.

11. Apparatus according to claim 1, wherein each of said switching unit and said probe unit are hand-held and battery powered.

12. Apparatus according to claim 1, wherein said pair of conductors constitutes a communications line.

13. Apparatus according to claim 12, wherein said communications line is a telephone line.

14. Apparatus according to claim 1, wherein said detecting means is a receiver tuned to the frequency of said signal, including means to detect the voltage between said pair as a result of said signal being applied thereto and/or the signal current flowing through the short circuit, the output from the receiver being rectified, filtered, and converted into pulses which cause a stepping relay, or digital logic circuits, to cycle through the said sequence.

15. Apparatus according to claim 14, in which said tuned receiver consists of a Riordan type gyrator, connected to a diode pump to rectify and filter the detected signal, connected in turn to a Schmitt trigger, the output of which is connected to the clock input of a counter comprised of one or more flip flop digital logic circuits.

16. Apparatus according to claim 1, wherein said switching unit includes bistable relays for use in establishing the desired connections.

17. Apparatus according to claim 15, wherein the output of said one or more flip flop digital logic circuits is connected via pulse generator circuits, each of which consists of a capacitor, resistors and a transistor, to the coils of bistable relays such that said coils are energized long enough to actuate the relays in order to reduce battery current drain.

18. Apparatus according to claim 1, wherein when said pair is short-circuited by said switching unit, a signal from said probe unit is detected by a current transformer in series with the link forming said short circuit, the output of the current transformer being connected via a preamplifier to the tuned receiver.

19. Apparatus according to claim 18, wherein said current transformer is replaced by a series resistor.

20. Apparatus according to claim 19, wherein the value of said resistor is in the vicinity of 50 milliohm.

21. Apparatus according to claim 8, wherein said switching unit automatically sets to said first mode when it is switched on.

22. Apparatus according to claim 21, wherein in said first mode a tone is automatically applied to said line.

23. Apparatus according to claim 8, wherein the means for producing said technician-observable signal is a loudspeaker.

24. Apparatus according to claim 8, wherein the means for producing said technician-observable signal is a piezoelectric transducer, to reduce power drain.

25. Apparatus according to claim 24, wherein the output of the high impedance amplifier is fed via an ideal rectifier, acting as a frequency doubler, to the piezoelectric transducer, the purpose of the frequency doubler being to match the frequency of the identification tone more closely to the resonant frequency of the piezoelectric transducer to get the maximum effective audio signal output.

26. Apparatus according to claim 25, wherein the output of the frequency doubler is fed via two amplifiers out of phase to the two sides of the piezoelectric transducer, so that the effective output signal from the transducer is effectively doubled.

27. A method for disconnecting and short-circuiting a pair of conductors, including the steps of connecting a switching unit to one end of said pair, and connecting a probe unit to the other end of said pair of conductors, causing said probe unit to apply a predetermined signal to said pair, said switching unit being responsive to said signal to switch said conductors between a number of predetermined modes.

28. A method according to claim 27, wherein said switching between modes takes place sequentially.

29. A method according to claim 27, wherein said modes consist of a first mode in which a tone may be applied to said line, a second mode in which the line is disconnected, and a third mode in which the line is short-circuited.

30. A method according to claim 27, wherein the frequency of said signal is about 175 Hz.

31. A method according to claim 27, wherein the frequency of said signal is about 150 Hz.

* * * * *